United States Patent Office

2,951,072
MONOAZO DYESTUFFS OF THE AZO NAPHTHALENE SERIES CONTAINING A MONOHALOGENO-s-TRIAZINE NUCLEUS

Colin George Tilley and Frederick Andrew Waite, Manchester, England, assignors to Imperial Chemical Industries Limited, London, England, a corporation of Great Britain No Drawing. Filed Mar. 20, 1959, Ser. No. 800,654

Claims priority, application Great Britain Feb. 27, 1959

1 Claim. (Cl. 260—153)

This invention relates to new monoazo dyestuffs. More particularly, it relates to new monoazo dyestuffs obtained from cyanuric halides, valuable for the production of colourations on cellulose textile materials fast to wet treatments.

According to the invention there are provided the new monoazo dyestuffs which, in their free acid form are represented by the formula:

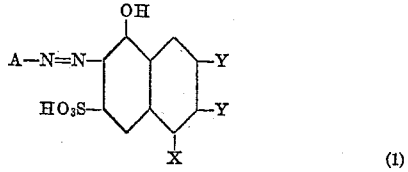

(1)

wherein A stands for a 1-sulpho-2-naphthyl group optionally containing additional sulphonic acid groups, X stands for a hydrogen atom, a halogen atom or a sulphonic acid group, one Y stands for a hydrogen atom or a sulphonic acid group and the other Y stands for a group of the formula:

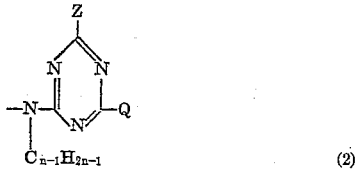

(2)

wherein Z stands for a halogen atom, $n$ stands for an integer and Q stands for a substituent containing at most 13 carbon atoms and bound to the triazine nucleus through a carbon, nitrogen, oxygen or sulphur atom.

In the above formula, A may represent, for example, a 1-sulpho-, 1:5-disulpho-, or a 1:5:7-trisulphonaphthyl group.

The symbol $n$ in the above formula preferably represents an integer of from 2 to 5, so that the group $-C_{n-1}H_{2n-1}$ preferably represents an alkyl group of 1 to 4 carbon atoms, especially the methyl group.

The symbol Q in the above formula may represent, for example, an amino group, an alkyl group, preferably a lower alkyl group such as methyl, ethyl or butyl, or an aryl, especially monocyclic aryl, group such as phenyl, o-, m- or p-methylphenyl or o-, m- or p-methoxy phenyl, and preferably a sulphonated phenyl containing at most 13 carbon atoms and bound directly or through a nitrogen, sulphur or an oxygen atom to the triazine nucleus.

A preferred class of the new monoazo dyestuffs are those represented in the acid form by the formula:

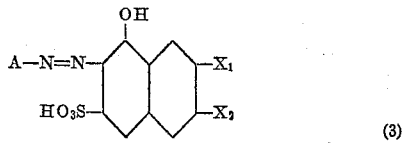

(3)

wherein A has the meaning stated above, one of $X_1$ and $X_2$ stands for a hydrogen atom and the other for a group of the formula:

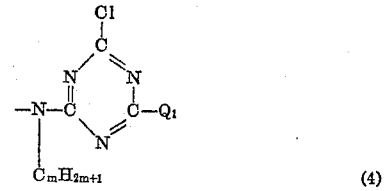

(4)

wherein $m$ stands for an integer of up to 4 and $Q_1$ stands for an amino, methoxy, phenoxy, anilino or sulphonated anilino group.

The invention also provides a process for manufacture of the new monoazo dyestuffs which comprises coupling a diazotised 2-naphthylamine-1-sulphonic acid which may contain additional sulphonic acid groups with a coupling component of the formula:

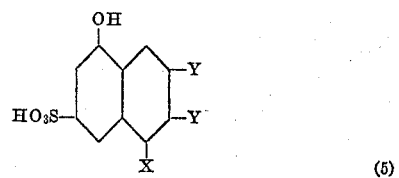

(5)

wherein X and Y have the meanings stated above.

Suitable 2-naphthylamine-1-sulphonic acids include, for example 2-naphthylamine, mono-, di- and tri-sulphonic acids such as 2-naphthylamine-1-sulphonic acid, 2-naphthylamine - 1:5 - disulphonic acid and 2 - naphthylamine-1:5:7-trisulphonic acid.

The coupling components of Formula 5 above may be obtained by reacting a naphthol of the formula:

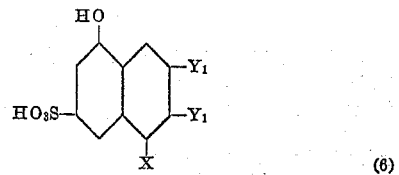

(6)

wherein X has the meaning given above, one $Y_1$ stands for a hydrogen atom or a sulphonic acid group and the other $Y_1$ stands for an amino or alkylamino group, with a dihalogeno-s-triazine, under conditions such that one halogen atom remains attached to the triazine ring.

Suitable naphthols of Formula 6 above include, for example, 2-amino-5-naphthol-7-sulphonic acid, 2-amino-5-naphthol-1:7-disulphonic acid, 2-amino-8-naphthol-6-sulphonic acid, 2-amino-8-naphthol-3:6-disulphonic acid, 2-amino-1-chloro-5-naphthol-7-sulphonic acid, and more especially, N-alkyl derivatives of these such as 2-ethylamino-, 2-beta-hydroxyethylamino- and 2-butylamino-8-naphthol-6-sulphonic acid, 2-ethylamino-1-chloro-8-naphthol-6-sulphonic acid, 2-propylamino-8-naphthol-3:6-disulphonic acid, 2-methylamino-1-chloro-5-naphthol-7-sulphonic acid, 2-methylamino-5-naphthol-1:7-disulphonic acid, and above all, 2-methylamino-5-naphthol-7-sulfonic acid and 2-methylamino-8-naphthol-6-sulphonic acid.

Suitable dihalogeno - s - triazines include 2-alkyl-4:6-dihalogeno-s-triazines such as 2-methyl-4:6-dichloro-s-triazine, 2-ethyl-, 2-cyclohexyl-, and 2-dodecyl-4:6-dichloro-s-triazines, 2-aryl-4:6-dihalogeno-s-triazines such as 2-phenyl-4:6-dichloro-s-triazine, 2-2'-methoxyphenyl-4:6-dichloro-s-triazine, 2-4'-methylphenyl-4:6-dichloro - s - triazine and 2-aralkyl-4:6-dihalogeno-s-triazines such as 2-benzyl-4:6-dichloro-s-triazine.

Preferably, however, there are used the dihalogeno-s-triazines obtained by reacting a cyanuric halide, preferably the chloride, with 1 molecular proportion of primary or secondary amine, a thiol or a hydroxy compound, containing at most 13 carbon atoms. As examples of such compounds, there come into consideration, ammonia, aliphatic or aromatic amines such as methylamine, dimethylamine, ethylamine, diethylamine, iso-propylamine, butylamine, mono-and di-(beta-hydroxyethyl)amine, benzylamine, cyclo-hexylamine, dodecylamine, aniline, o-, m- and p-toluidines, aniline o-, m- and p-sulphonic acids, p-aminoacetanilide, o-, m- and p-anisidines, o-, m- and p-chloroanilines, aniline-o-, m- and p-carboxylic acids, N-methyl-aniline, N-ethylaniline, piperidine, o-, m- and p-nitro-anilines, m-aminobenzotrifluoride, 1- and 2-naphthylamines, 1-naphthylamine-4-, 5-, 6-, 7-sulphonic acids, and m- and p-aminobenzoic acids, mercaptans such as thiophenol, thio-beta-naphthol, o-, m- and p-thiocresols, phenols such as phenol itself, o-, m- and p-cresols, o-, m- and p-chlorophenols, and m- and p-nitrophenols, and alcohols such as ethanol, propanol-1, propanol-2 and methanol.

In the process of the invention, the coupling is preferably carried out under slightly acid or neutral conditions and at as low a temperature, preferably below 10° C., as will allow the coupling to take place, so as to minimise side-reactions, in particular the loss, by hydrolysis, of the halogen atom attached to the triazine ring.

The new monoazo dyestuffs may also be obtained by a modification of the above process wherein a dihalogeno-s-triazine, as used as a starting material for the manufacture of the coupling components of Formula 5 above, is condensed with at most one molecular proportion of a monazo compound which, in the acid form, is represented by the formula:

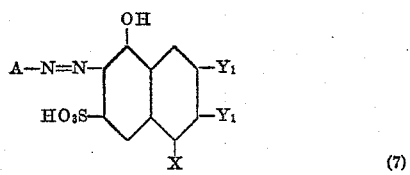

(7)

wherein A, X and $Y_1$ have the meanings given above. This modified process forms a further feature of the invention.

The monoazo compounds of Formula 7 may be obtained by coupling a diazotised 2-naphthylamine-1-sulphonic acid, which may contain additional sulphonic acid groups, either under strongly alkaline conditions with a naphthol of Formula 6 above, or preferably under weakly acid, neutral or weakly alkaline conditions, with an N-acyl, for example the acetyl, derivative of such a naphthol thereafter removing the acyl group by hydrolysis, for example, by heating with aqueous mineral acid.

Yet a further feature of the invention is directed towards the manufacture of those monoazo dyestuffs of the invention in which the symbol Q in Formula 2 stands for a substituent containing at most 13 carbon atoms and bound to the triazine nucleus through a nitrogen atom. These may be obtained from a monoazo compound which, in the acid form, is represented by the formula:

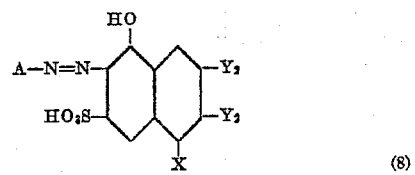

(8)

wherein A and X have the meanings given above, one $Y_2$ stands for a hydrogen atom or a sulphonic acid group and the other $Y_2$ stands for a dihalogeno-s-triazinylamino or a N-(dihalogeno-s-triazinyl)alkylamino group. According to the further feature of the invention, the said monoazo compound is reacted with 1 molecular proportion of ammonia or a primary or secondary amine containing at most 13 carbon atoms.

The monoazo compounds of Formula 8 may be obtained either by condensing a cyanuric halide with one molecular proportion of a monoazo compound of Formula 7 above or by coupling a diazotised aromatic primary amine free from hydroxyl groups with a naphthol of the formula:

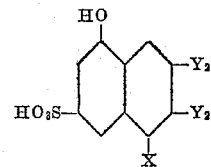

(9)

wherein X and $Y_2$ have the meanings given above.

These modified processes of the invention are advantageously carried out in the presence of an acid-binding agent, preferably an alkali-metal carbonate or bicarbonate. They are carried out under such conditions that the final product still contains a single atom of chlorine or bromine attached to the triazine nucleus, that is, for example, in an organic solvent or, preferably, at a relatively low temperature in an aqueous medium.

The new monoazo dyestuffs may be isolated from the medium in which they have been formed by customary techniques; for example they may be isolated in the form of an alkali-metal salt such as the potassium, or preferably the sodium, salt by salting the neutralised reaction mixture and filtration of the precipitated dyestuff. The filtered dyestuff may be dried, if desired after the addition of an extender. The drying is preferably carried out at a moderate temperature, for example at a temperature between 50° C. and 80° C.

The new monoazo dyestuffs are valuable dyestuffs for cellulose textile materials when applied in conjunction with an acid-binding agent, for example by the process described in British specification No. 797,946 wherein the colored textile material is aftertreated with an acid-binding agent, or by related processes wherein an acid-binding agent is applied to the textile material before or during the treatment with the dyestuff.

When so applied, the new monoazo dyestuffs give red to orange colorations of good light fastness very fast to washing, especially to washing treatments in the presence of hypochlorite bleach. They have an advantage over the dyestuffs of similar shade described in the said specification in that they are more stable chemically in aqueous solutions containing acid-binding agents; thus thickened printing pastes containing the new monoazo dyestuffs and an acid-binding agent are especially valuable for use in the printing process of the said specification.

Furthermore, the shades from dyestuffs of the preferred class defined by Formula 3 above give very little or no staining of adjacent white portions of cellulose during washing, especially when washing in the presence of hypochlorite.

The invention is illustrated but not limited by the following examples in which parts are by weight:

*Example 1*

Diazotised 2-naphthylamine-1:5-disulphonic acid is coupled with 2-N-methylacetamido-5-naphthol-7-sulphonic acid and the product obtained is hydrolysed by boiling with dilute sodium hydroxide solution. To a solution of 61.9 parts of the trisodium salt of the aminoazo compound so obtained in 1000 parts of water there is added a solution of 23.4 parts of 2-methoxy-4:6-dichloro-s-triazine in 400 parts of acetone. The mixture is stirred at 20° C. for 3 hours, the pH being maintained at 7 by the addition of dilute sodium carbonate solution. The mixture is salted with sodium chloride to the extent of 150 grams per litre and the precipitated dyestuff is filtered off. The filter cake is washed with 400 parts of acetone and dried at 60° C.

The monoazo dyestuff so obtained, when applied to cellulose fibres by the methods indicated above, gives orange shades having good fastness to washing and excellent fastness to bleach treatments with sodium hypochlorite.

If the 2-methoxy-4:6-dichloro-s-triazine used in the above example is replaced by 31.5 parts of 2-phenoxy-4:6-dichloro-s-triazine a similar dyestuff is obtained.

Example 2

To a solution of 78.1 parts of the trisodium salt of 2:4 - dichloro - 6 - {N - methyl - N - [5' - hydroxy - 6'- (1":5" - disulphonaphth - 2" - ylazo) - 7' - sulphonaphth-2'-yl]-amino}-s-triazine, obtained as described below, in 1000 parts of water there is added a solution of 19.5 parts of the sodium salt of aniline-3-sulphonic acid in 400 parts of water. The mixture is stirred at a temperature between 35° and 40° C. for 48 hours, the pH being maintained at 7 by the addition of dilute sodium carbonate solution. The product was isolated by drowning the solution in alcohol and filtering. The filter cake is washed with 200 parts of acetone and dried at 60° C.

When applied to cotton by the methods indicated above the dyestuff yields orange shades which have good fastness to washing and excellent fastness to bleaching treatments with sodium hypochlorite.

The dichlorotriazinyl compound used in the above example may be obtained by stirring a neutral aqueous solution of the aminoazo compound used in Example 1 with 1 to 1.1 molecular proportions of cyanuric chloride at a temperature of 0 to 5° C. until no unchanged aminoazo compound can be detected.

Similar orange dyestuffs are obtained when the dichlorotriazinyl compounds named in column I of the table below, are reacted with the corresponding amino compound named in column II of the table.

| Dichlorotriazinyl compound | Amino Compound |
|---|---|
| 2:4 - Dichloro-6-{5'-hydroxy-6'-(1":5" - disulphonaphth-2"-ylazo)-7'-sulphonaphth-2'-ylamino}-s-triazine. | Aniline. |
| 2:4-Dichloro-6-{5'-hydroxy-6'-(1":5":7"- trisulphonapth-2"-ylazo)-7'-sulphonapth-2'-ylamino}-s-triazine. | Ammonia. |
| 2:4-Dichloro-6-{5'-hydroxy-6'-(1"-sulphonapth-2"-ylazo)-1':7'-disulphonaphth-2'-ylamino}-s-triazine. | Aniline-4-sulphonic acid. |

If the dichlorotriazinyl compound used in the above example is replaced by 2:4-dichloro-6-{N-methyl-N-[8'-hydroxy - 7' - (1":5" - disulphonaphth - 2" - ylazo) - 6'-sulphonaphth-2'-yl]amino}-s-triazine, a scarlet dyestuff of good fastness to washing and excellent fastness to bleach treatments with sodium hypochlorite is obtained.

What we claim is:

Monoazo dyestuffs represented in the acid form by the formula:

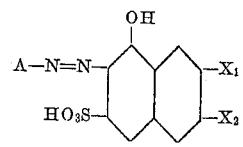

wherein A stands for a member selected from the group consisting of 2-naphthyl-1-sulfonic acid, 2-naphthyl-1:5-disulfonic acid, and 2-naphthyl-1:5:7-trisulfonic acid, one of $X_1$ and $X_2$ stands for a hydrogen atom and the other for a group of the formula:

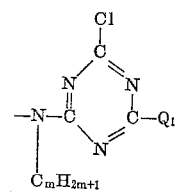

wherein $m$ is an integer from 1 to 4 and $Q_1$ stands for a radical selected from the group consisting of amino, methoxy, phenoxy, anilino and sulphonated anilino.

References Cited in the file of this patent

UNITED STATES PATENTS

| 2,873,269 | Fasciati et al. | Feb. 10, 1959 |
| 2,892,671 | Alsberg et al. | June 30, 1959 |